(12) United States Patent  
Wiese et al.

(10) Patent No.: US 8,443,355 B2  
(45) Date of Patent: May 14, 2013

(54) LIFE CYCLE MANAGEMENT SYSTEM FOR INTELLIGENT ELECTRONIC DEVICES

(75) Inventors: Wilhelm Wiese, Singapore (SG); Ahmad Hasan Khan, Zurich (CH)

(73) Assignee: ABB Research Ltd. (CH)

( * ) Notice: Subject to any disclaimer, the term of this patent is extended or adjusted under 35 U.S.C. 154(b) by 1159 days.

(21) Appl. No.: 12/352,155

(22) Filed: Jan. 12, 2009

(65) Prior Publication Data

US 2009/0204458 A1   Aug. 13, 2009

Related U.S. Application Data

(63) Continuation of application No. PCT/IB2006/001381, filed on Jul. 11, 2006.

(51) Int. Cl.
*G06F 9/445* (2006.01)

(52) U.S. Cl.
USPC ........... 717/168; 717/121; 717/170; 717/173; 717/177; 702/179; 702/182; 702/183; 702/186

(58) Field of Classification Search ........................ None
See application file for complete search history.

(56) References Cited

U.S. PATENT DOCUMENTS

| | | | |
|---|---|---|---|
| 6,081,665 A * | 6/2000 | Nilsen et al. ................... | 717/116 |
| 6,795,798 B2 | 9/2004 | Eryurek et al. | |
| 6,862,553 B2 * | 3/2005 | Schwenke et al. ............ | 702/183 |
| 7,096,465 B1 * | 8/2006 | Dardinski et al. ............ | 717/178 |
| 7,143,007 B2 * | 11/2006 | Long et al. ..................... | 702/184 |
| 7,206,646 B2 * | 4/2007 | Nixon et al. .................... | 700/83 |
| 7,730,498 B2 * | 6/2010 | Resnick et al. ................ | 719/328 |
| 2002/0123864 A1 * | 9/2002 | Eryurek et al. ................ | 702/188 |
| 2003/0004765 A1 * | 1/2003 | Wiegand ............................. | 705/7 |
| 2004/0249920 A1 * | 12/2004 | Ogasawara et al. ........... | 709/223 |
| 2005/0010377 A1 * | 1/2005 | Stake et al. ..................... | 702/188 |
| 2006/0235707 A1 * | 10/2006 | Goldstein et al. ................. | 705/1 |
| 2007/0234293 A1 * | 10/2007 | Noller et al. ................... | 717/124 |

FOREIGN PATENT DOCUMENTS

| | | |
|---|---|---|
| WO | 01/02953 A1 | 1/2001 |
| WO | 0165428 A2 | 9/2001 |
| WO | 03014851 A1 | 2/2003 |
| WO | 03027972 A2 | 4/2003 |
| WO | 2005104055 A2 | 11/2005 |

OTHER PUBLICATIONS

International Seach Report and Written Opinion of the International Search Authority, PCT/IB2006/001381, Nov. 11, 2008, 8 pages.

* cited by examiner

*Primary Examiner* — Isaac Tecklu
(74) *Attorney, Agent, or Firm* — St. Onge Steward Johnston & Reens LLC

(57) ABSTRACT

This invention relates to the Life Cycle Management System for distributed Intelligent Electronic Devices (IED) starting from the design phase to the end of service phase. Hence, it caters to the needs from installation via engineering, installation/commissioning phases, until asset management and remote service support of the devices during the operational phase The increasing decentralization of the involved components via networks, especially via the Internet, is a key criterion and needs to be addressed by the life cycle management. The added value for the customer grows disproportionately with the degree of integration of multiple independent software components into a complex and often highly distributed control system. The architecture of today's control systems must be sufficiently flexible to allow customers to regard their plant components from various locations. Additionally, the stability, security and maintainability of such a system is strongly dependent on the homogeneity and interoperability of all involved components.

39 Claims, 20 Drawing Sheets

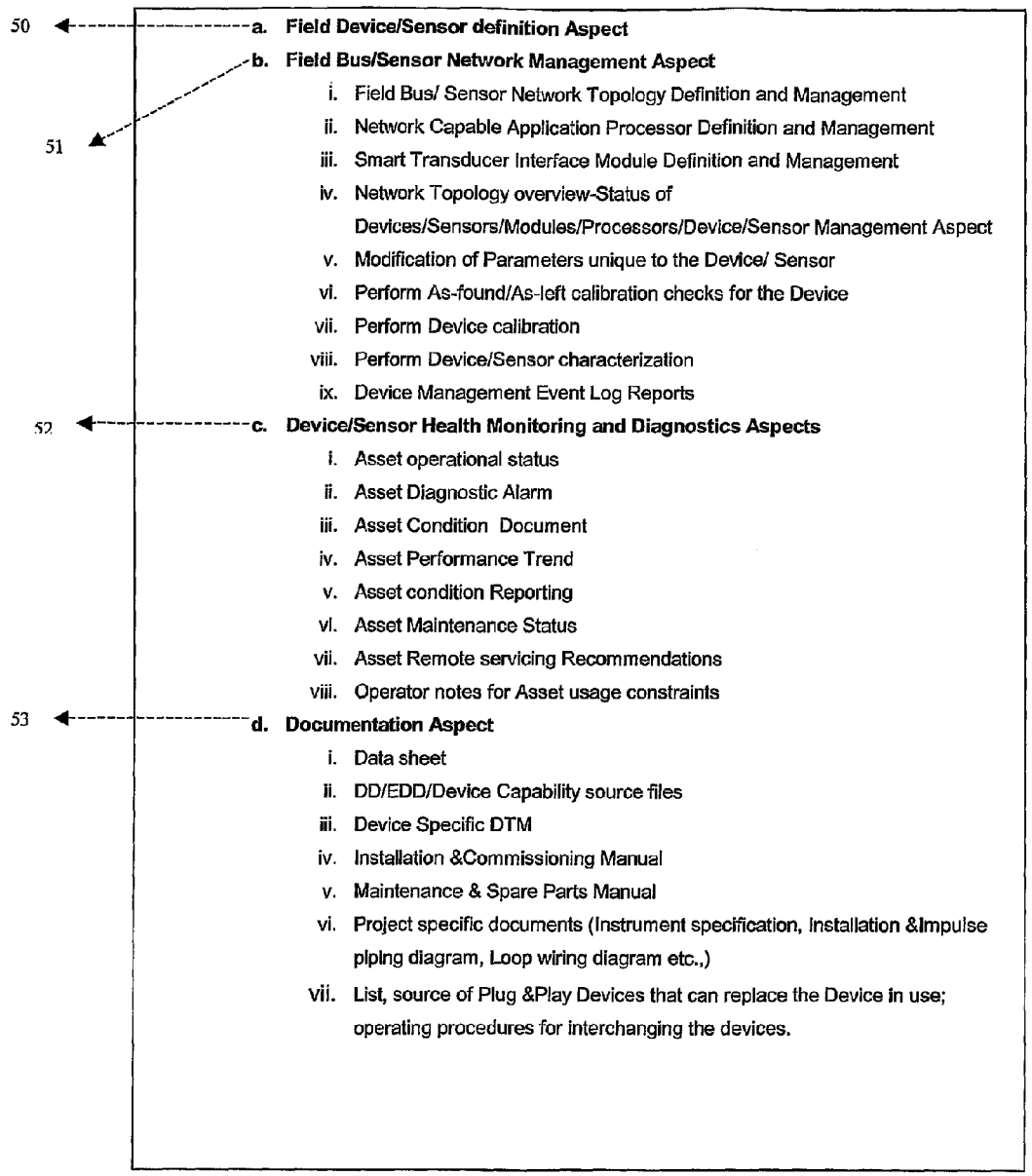

50
51
52
53 a. Field Device/Sensor definition Aspect
b. Field Bus/Sensor Network Management Aspect
  i. Field Bus/ Sensor Network Topology Definition and Management
  ii. Network Capable Application Processor Definition and Management
  iii. Smart Transducer Interface Module Definition and Management
  iv. Network Topology overview-Status of Devices/Sensors/Modules/Processors/Device/Sensor Management Aspect
  v. Modification of Parameters unique to the Device/ Sensor
  vi. Perform As-found/As-left calibration checks for the Device
  vii. Perform Device calibration
  viii. Perform Device/Sensor characterization
  ix. Device Management Event Log Reports
c. Device/Sensor Health Monitoring and Diagnostics Aspects
  i. Asset operational status
  ii. Asset Diagnostic Alarm
  iii. Asset Condition Document
  iv. Asset Performance Trend
  v. Asset condition Reporting
  vi. Asset Maintenance Status
  vii. Asset Remote servicing Recommendations
  viii. Operator notes for Asset usage constraints
d. Documentation Aspect
  i. Data sheet
  ii. DD/EDD/Device Capability source files
  iii. Device Specific DTM
  iv. Installation &Commissioning Manual
  v. Maintenance & Spare Parts Manual
  vi. Project specific documents (Instrument specification, Installation &Impulse piping diagram, Loop wiring diagram etc.,)
  vii. List, source of Plug &Play Devices that can replace the Device in use; operating procedures for interchanging the devices.

Figure 5

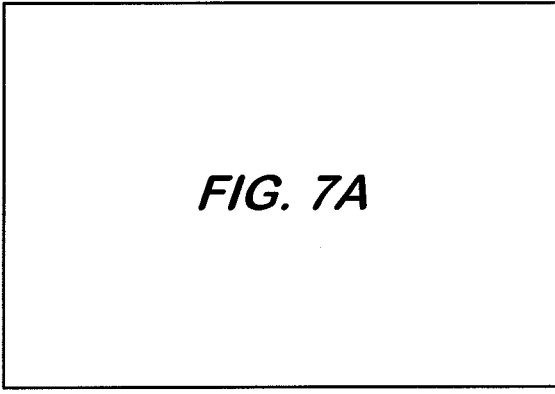
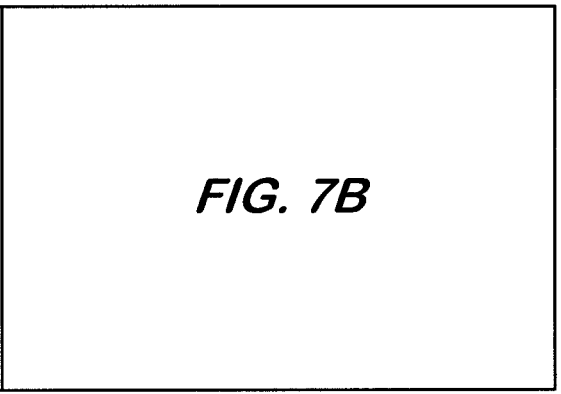
*FIG. 7*
(LEGEND)

(LEGEND)

FIG. 12

| | |
|---|---|
| 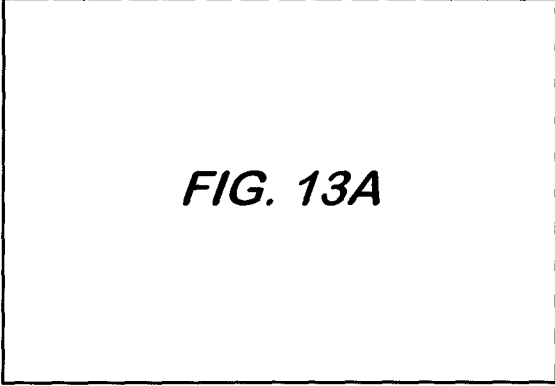 | 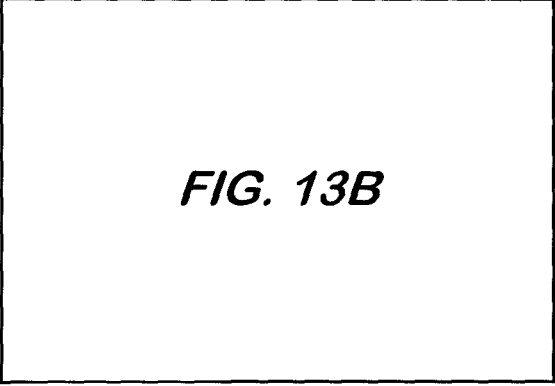 |
FIG. 13
(LEGEND)

FIG. 13B

LIFE CYCLE MANAGEMENT SYSTEM FOR INTELLIGENT ELECTRONIC DEVICES

CROSS-REFERENCE TO RELATED APPLICATIONS

The present application is a continuation of pending International patent application PCT/IB2006/001381 filed on Jul. 11, 2006 which designates the United States and the content of which is incorporated herein by reference.

FIELD OF THE INVENTION

This invention relates to life cycle management systems. More specifically, this invention relates to a life cycle management system (LCMS) that allows location-independent control of a plurality of devices within a process plant, by integrating information from asset monitors within the plant and all stages in the life cycle of the Intelligent Electronic Device.

BACKGROUND OF THE INVENTION

The life cycle of any Intelligent Electronic Device (IED), also referred to as an asset, includes all the activities that start with design and engineering phases of the process plant application needing the device, going on to selecting a manufacturer and device to suit the application, the procurement and placement of the device into service, operating the device while it is deployed and culminating in retirement of the device from service. In the operational phase, the device is also managed and maintained to provide sustained and reliable service.

IEDs provide services to Process Industries, Discrete Component Manufacturing Industries, Power Generation, Transmission and Distribution Utilities etc. Amongst the various stages in the life cycle of an IED, there exists a variety of device management and maintenance operations performed by process plant personnel and device vendors. The device vendors perform support of disparate devices using a diverse array of tools and systems, rendering great complexity to the overall operations within the plant.

The complexity of today's systems stems from a variety of field bus standards, a number of diagnostic and maintenance tools for device management, backward compatibility requirements for several software versions necessitated in order to protect one's investment over time, several software versions of host application standards and the introduction of the Internet. For example, disparate industry standards for field bus networks in typical manufacturing plants could be any of ProfiBus, Device Net, Foundation Field Bus (for the Process Industries), Inter Bus S, Control Net and CAN Open (for the Discrete Manufacturing Industries). HART protocols need inclusion in this list even though they are not field bus protocols, as they present the same requirements towards a holistic LCMS. The disparate protocols mentioned have individual engineering tools to configure, install, commission and maintain devices that are connected using those protocols.

Field bus networks have evolved over the last ten years and many of them remain viable for many more years to come. Customers are keen to protect the investment they have made on these devices and networks, consequently being required to maintain diverse engineering tools and skills to keep the overall system running. Simply reducing the number of allied standards does not readily translate to reduced complexity. In other words, a LCMS needs to consider and make provisions for obsolete standards in a consistent manner.

At the present time, the players involved in the different stages in the life cycle of the devices in a process plant and the overall system in that plant are the design engineers, the device vendors offering support to the devices deployed, the control operator controlling the overall operation of the plant etc. The device vendors presently provide Electronic Device Description (EDD) source files written using the Electronic Device Description Language (EDDL) to standardize a simple operator control interface. This technology does not address the problems that the customer faces in coping with a diversity of vendor specific engineering tools to set up, configure, install, commission and perform the life cycle management of devices. The newer technology of Field Device Tool (FDT) and Device Type Manager (DTM), intended as an extension of the EDDL technology, has addressed this issue. This technology made it possible to have a common interface at the host systems to engineer and operate the field device networks with the field devices supplied by different vendors. This technology consequently increased the need for a LCMS owing to the large number software components, each having related and independent updates and upgrades, with respect to the host platform. Device vendors are often reluctant to shoulder the responsibility of providing DTMs for the devices which they supply, owing to the disparity in host platforms, changing software version releases for the underlying Operating Systems etc. Ethernet is now popular in process plant environments, and is rapidly evolving to accommodate an application subset that extends beyond hard real-time applications. This has further complicated the scenario. The emerging standards of ProfiNet, Ethernet IP and Ethernet for Control and Automation Technology (ECAT) are also responsible for introducing even more field devices. FDT/DTM tools are commonly unavailable for these devices utilizing the above-mentioned standards of ProfiNet, Ethernet IP and ECAT. Further, when there is a need to deploy EDDL and FDT/DTM technology concurrently, the complexity of the system increases further.

With the Internet enabling greater access with respect to Engineering and Asset Management systems, which provide thin client applications, the need for synchronization and inter-operability with the core system is amplified. Furthermore, device vendors provide several remote services and a multitude of web library servers (for different bus protocols such as PNO, ProfiBus, HART etc.), also enabled by the Internet. The design paradigm is rapidly evolving towards increasing the role of the Internet in basic connectivity of devices and other operations on devices.

Several Computerized Maintenance Management System (CMMS) packages (also known as Common Asset Management or Engineering Systems) are available for plant operators to choose from including IFCS, Maximo and SAP. These systems focus on Enterprise Application Integration and have limitations when it comes to integrating diagnostic information from devices deployed in the field.

Plant operators have available to them a variety of desktop tools, hand-held devices and commercially available Personal Data Assistants (PDAs) to enable them to receive and analyze information pertaining to the devices in the plant. These tools and mobile devices encourage the engagement of web servers to relay the information enabling location-independence when it comes to managing the life cycle of the system.

Common Asset Management or Engineering Systems referred to above have diverse customer interfaces for gathering such information, but do not have common Human Man-Machine Interfaces (HMMIs) for life cycle management information. This is because life cycle management implies control over a larger subset of tasks (including engineering design and documentation) having to do with field devices, as opposed to the CMMS or Common Asset Management or Engineering Systems.

It is a major shortcoming of the existing systems to address the complexity introduced by the disparity in protocols, tools, implementation platforms, software versions and network configurations.

PCT Patent WO 01/02953 discloses a Method of integrating an application in a computerized system, presenting a system for computerized control of a real world object, making allowances for interlinking objects systematically. This patent introduces the concept of Composite Objects, containing Aspects representing facets of real world objects. This concept of Aspects is utilized in the present invention, however, the present invention extends beyond systematic representation and computerized control, to providing a LCMS in the case of process plants. Incorporating information from several stages in the life cycle of a device is not explored in the PCT Patent, it only provides a mechanism to enable such incorporation. The LCMS proposed by the present invention is located on the control network to manage IEDs in such domains as Process Automation and Manufacturing Automation. The means for maintaining information for a device or product through its various life cycle stages is enabled by the concept of Aspect Views of real world objects, from several different perspectives, each perspective being defined as a piece of information and set of functions to create, access, and manipulate the information provided. These Aspect Views are the building blocks of the Device Integration Aspect Objects.

U.S. Pat. No. 6,795,798 discloses a method for the Remote Analysis of process control plant data. This patent does not mention incorporating the documentation aspects within its design. Further, the central method of communication in the preferred embodiment uses XML.

SUMMARY OF THE INVENTION

It is an object of this invention to provide a Life Cycle Management System that incorporates, utilizes and relays information in the engineering, installation/commissioning and operational phases of IEDs commonly used in process plants. Another object of this invention is to address the complexity in a highly distributed control environment. This is achieved using a combination of compatibility checks and version control checks, allowing customer-interactivity where desired and relevant. Another object of this invention is to use information aggregated in Device Integration Aspect Objects, organized by different Aspects pertaining to the life cycle of an IED in conjunction with information obtained from asset monitors in various physical process plants, serviced by the LCMS, to provide asset optimization within the process plants. Further, this invention seeks to provide such control and optimization in a location-independent fashion, making provisions for such distributed environments as enabled by the Internet. Device vendors can connect to the information made available by the LCMS in order to provide diagnostic support, without being physically present at the plant site.

BRIEF DESCRIPTION OF THE DRAWINGS

FIG. 5 shows the details maintained in a Device Integration Aspect Object.
FIG. 12 shows the Asset Condition Report.

DETAILED DESCRIPTION OF THE INVENTION

The Life Cycle Management System of the present invention incorporates, utilizes and relays information in the engineering, installation/commissioning and operational phases of IEDs commonly used in process plants. Complexity in process plants are introduced by the diversity in field bus networks, network protocols, a number of diagnostic and maintenance tools for IED management, backward compatibility requirements for several software versions necessitated in order to protect one's investment over time, several software versions of host application standards and the introduction of the Internet.

Figure 1:
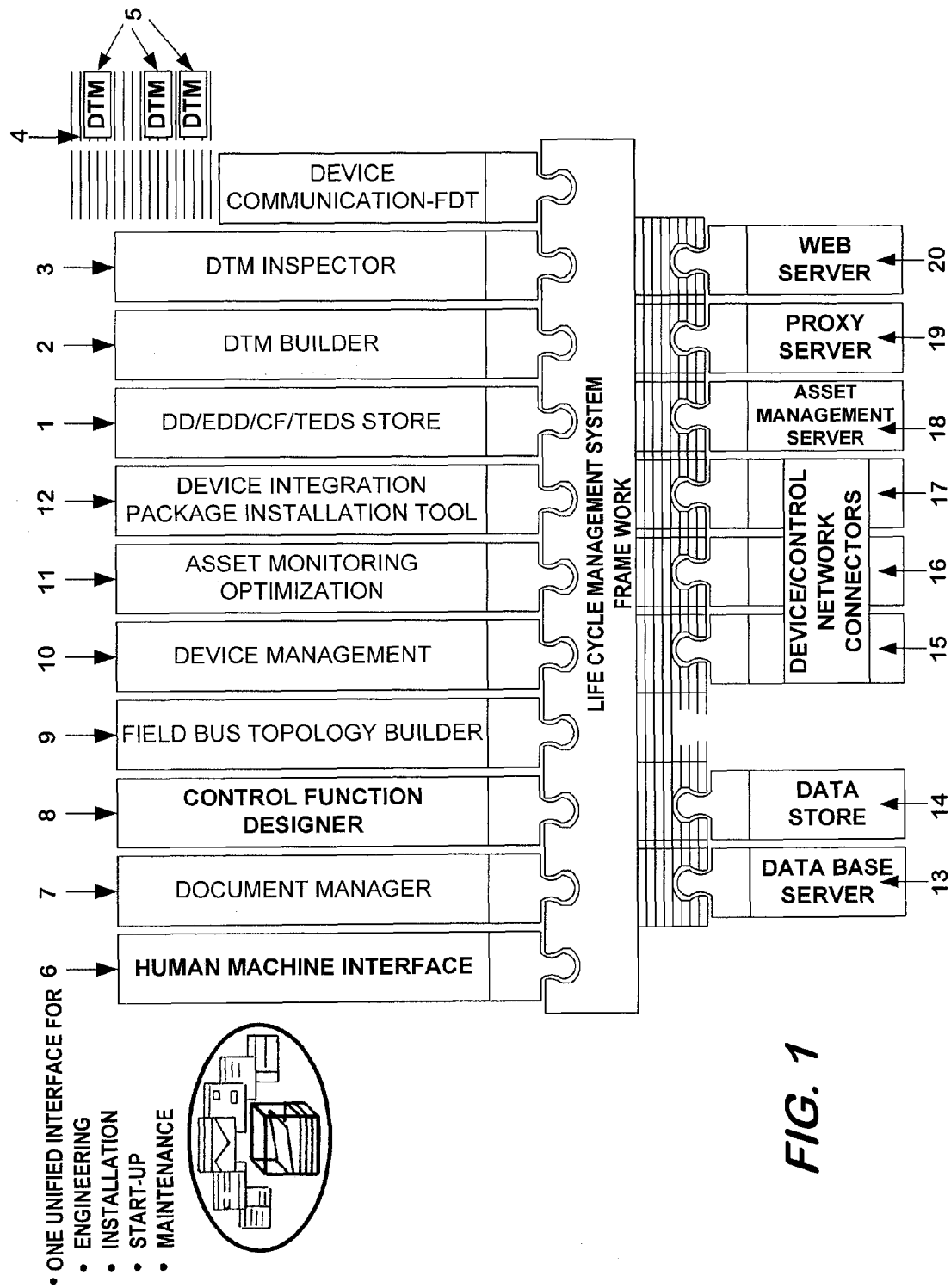
FIG. 1 provides an overview of the LCMS framework.

FIG. 1 provides an overview of the LCMS framework. The LCMS integrates standards such as the DD/EDD/CFI/TEDS store 1, DTM Builder 2, DTM Inspector 3, Device communication FDTs 4 connected to several DTMs 5. It further integrates various control technologies, for example, the Human Machine Interface (HMI) 6, document managers 7, control function designers 8, field bus topology builder 9, device management 10, Asset Monitoring/optimization 11 and device integration package installation tool 12. The interactions and data-flow between the modules detailed above are recorded and controlled by using a database server 13, a data store 14, a plurality of device connectors 15, control connectors 16 and network connectors 17, an Asset Management server 18, a proxy server 19 (when required), and a web server 20 (when required).

Figure 2:
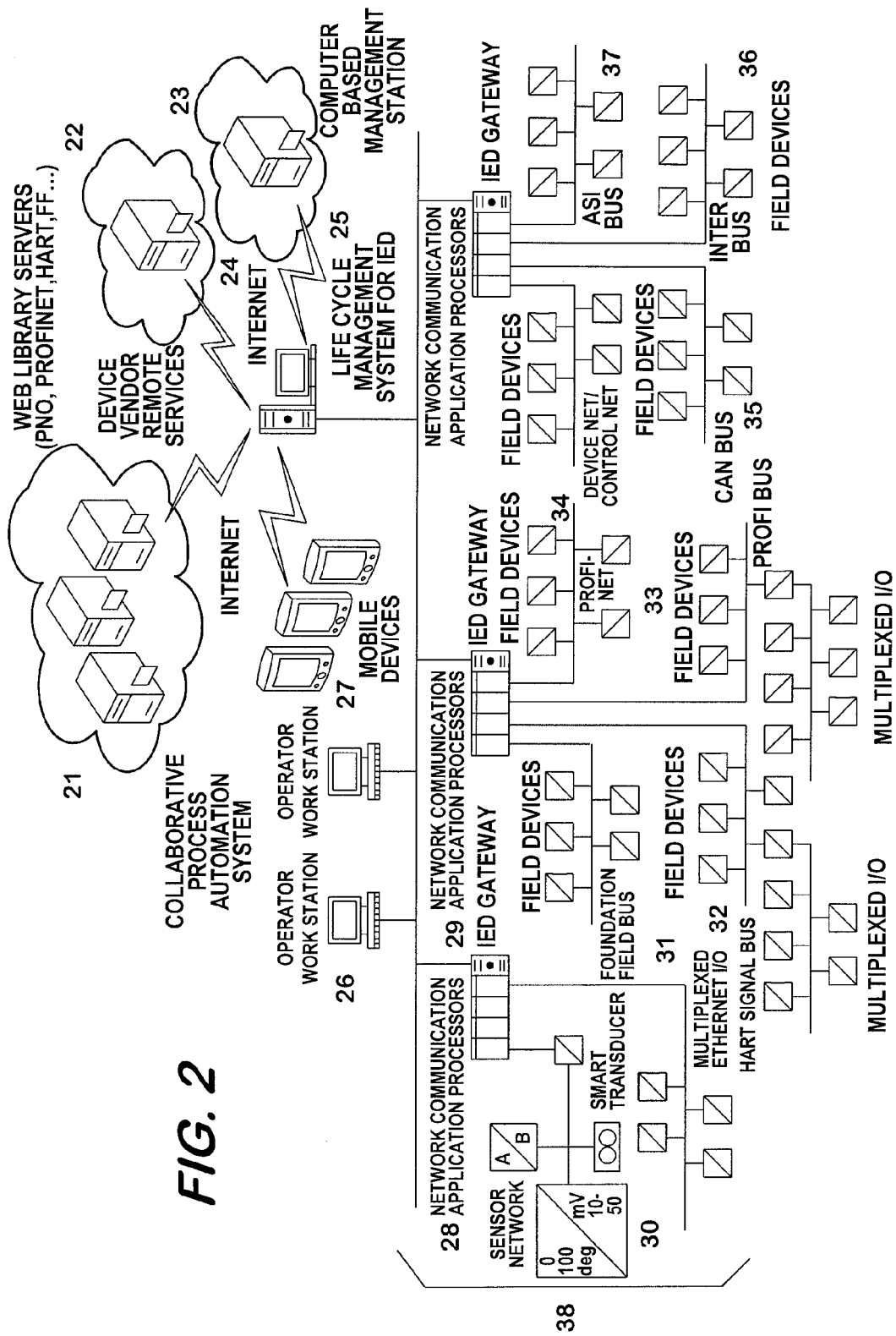
FIG. 2 shows the layout of an industrial plant

FIG. 2 shows the layout of a process plant 38, connected to a Life Cycle Management System 25. Within the process plant, there exists a number of sensor networks and smart transducers 30 and Field Devices, connected by networks such as Multiplexed EtherNet 31, a HART signal bus 32, ProfiBus 33, ProfiNet 34, CAN Bus 35, InterBus S 36 and ASI Bus 37. There exist one or a plurality of Operator Work Stations 26 which overlook the operations of the IEDs and networks. These networks, connecting the various IEDs, sensors, transducers etc., communicate with an IED Gateway 29 which in conjunction with a Network Communication Application Processor 28, collects data from all the devices and relays them to the Life Cycle Management System 25. The Life Cycle Management System 25, communicates with a variety of external systems such as, Computer Based Management Stations 23, Device Vendor Remote Service Stations 22, Web Library Servers 21 providing updates for various IEDs and control networks via the Internet and an array of mobile devices 27 which can be sent information for remote control and maintenance of the plant by an operator.

Figure 4:
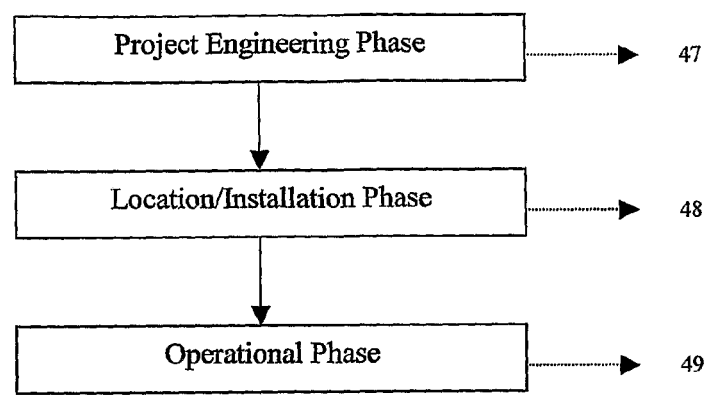
FIG. 4 shows the stages in the Life Cycle of a device.

The stages in the life cycle of an IED include an engineering phase, an installation/commissioning phase and an operational phase. These phases have several sub-phases within them. In the Engineering Phase the actual design is carried out and relevant documentation is generated and collected, for future reference. Further, there exist several engineering subsystems that need to be taken into account such as document managers for document administration, library assistants, reuse assistants, cross-reference tools and document import/export capabilities. In the Installation/commissioning Phase the physical location of the IED in the plant is defined in the drawings pertaining to layout of the IEDs in the plant. In addition, a set of drawings are made to define the installation/commissioning of the IED, its connection to the process on one end and on the other to the equipment in the control room via bus architectures, with details of installation/commissioning hardware (hubs/drop cables/couplers/power supply units). In the Operational Phase, several functions such as maintenance, performance monitoring etc. are carried out. In this phase, the Device Management System and the Computerized Maintenance Management Systems are treated as extensions to an Asset Management System that monitors the health of IEDs, generates the Asset Condition Report and alerts the concerned plant personnel. FIG. 4 shows the stages in the Life Cycle of an IED including the Engineering Phase 47, the Installation Phase 48 and the Operational Phase 49. The information pertaining to the state of the IED or assets from the various phases is aggregated into what are termed Aspects, which are the building block for Device Integration Aspect Objects. The different Device Integration Aspect Objects are populated with information from the various life cycle phases and do not correspond to information from a single or a set of life cycle phases. Examples of Aspects within this object include the Definition Aspect, the Documentation Aspect, the Diagnostics Aspect and the Configuration Aspect.

FIG. 5 shows the details maintained in a Device Integration Aspect Object, which is used to aggregate information from various stages in the life cycle of the IED. The Aspects represented in this object include the Field Device/Sensor definition Aspect 50, the Field Bus/Sensor Network Management Aspect 51, the Device/Sensor Health Monitoring and Diagnostics Aspect 52 and the Documentation Aspect 53.

Figure 6:
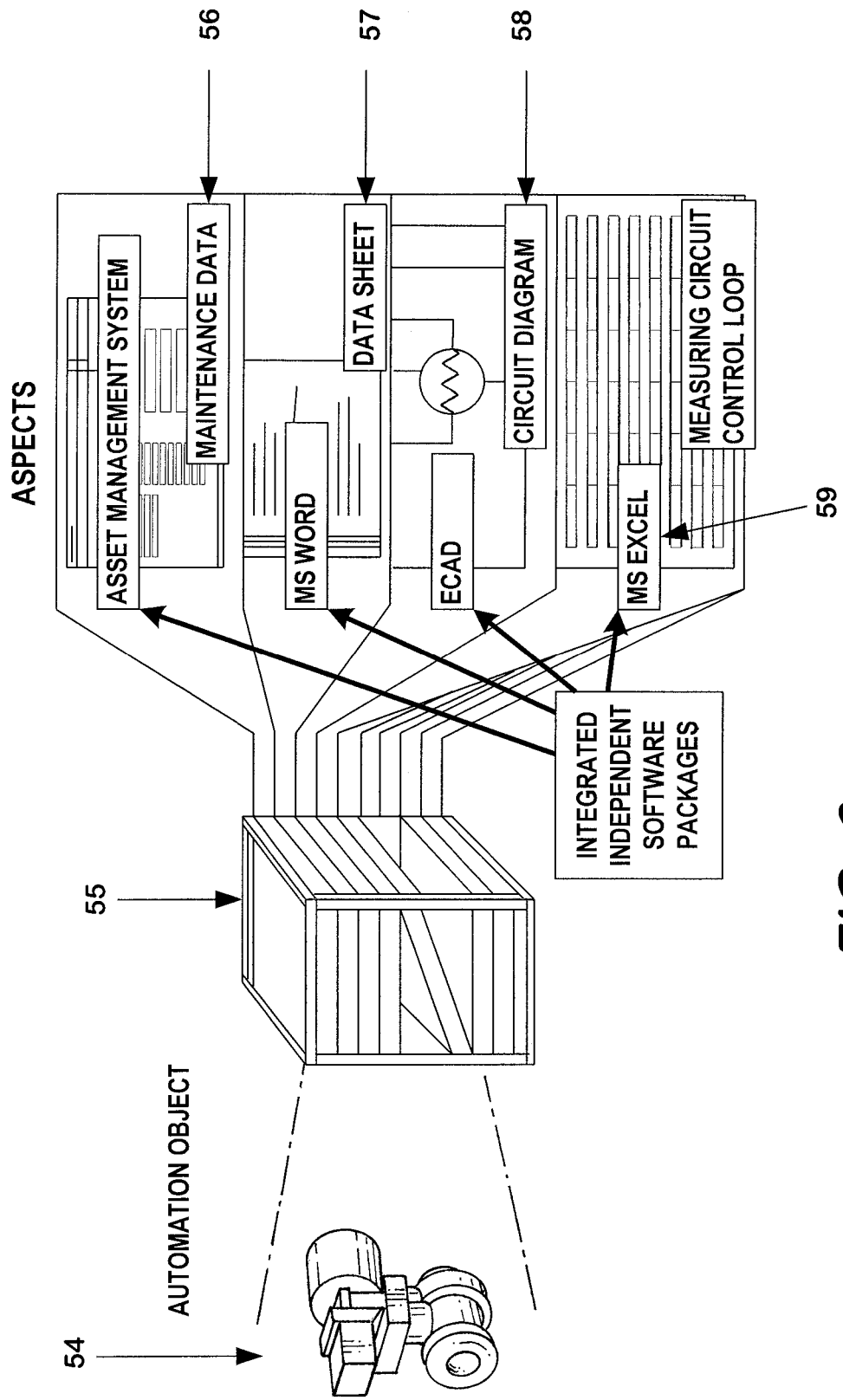
FIG. 6 shows an Automation Object, also referred to as a Device Integration Aspect Object.

FIG. 6 shows an Automation Object 54, also referred to as a Device Integration Aspect Object 55. The Device Integration Aspect Object aggregates information having to do with the IED, arranged in terms of Aspects. In this figure, special emphasis is placed on the Documentation Aspect. Documentation about an IED may come from various life cycle stages. For example, the engineering phase could include design documentation such as circuit diagrams 58. The installation phase might benefit from data sheets 57. The operational phase might use measurement information 59 and maintenance data 56. Even though this documentation might be present in different formats, the LCMS of the present invention makes provisions for storing these different formats and converting across formats, when necessary.

Figure 7A:
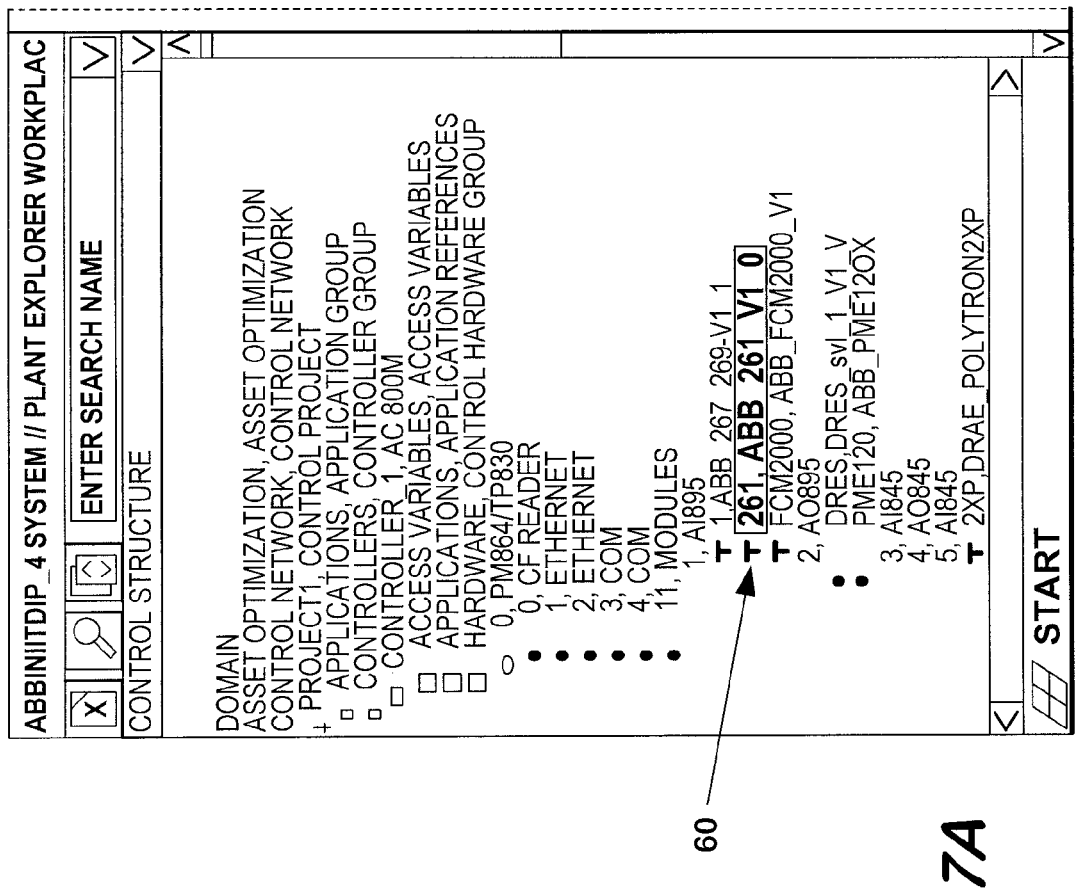
FIG. 7 expands on the Documentation Aspect.
Figure 7B:
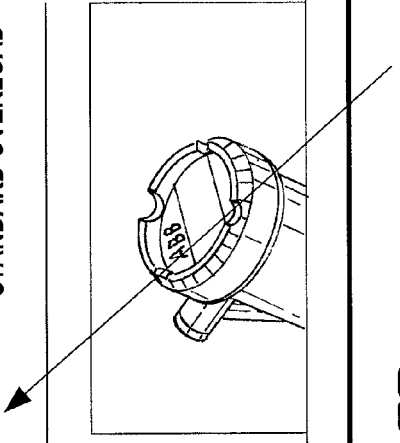

FIG. 7 expands on this Documentation Aspect further by presenting the means in which one subset of the LCMS, the Asset Management function maintains documentation 61 and displays it 62 for one particular IED 60.

The present invention has the means for creating Device Integration Aspect Objects to represent real world IEDs from several different perspectives, each perspective being defined as a piece of information. A set of functions to create, access, and manipulate the information is also provided. These different perspectives on a real world object are optionally represented by software applications, which are partly provided by the system vendor. An increasing amount of such software applications are provided by device manufacturers or third party companies, who provide add-on-applications like calibration management or CMMS functionalities. It is desirable to be able to integrate such software without changing the way these applications work internally, whereby it is not reasonable to require that all different applications are aware of each other.

Examples of device specific components and functions are:
installation/commissioning of device specific Device Type Manager
Configuration, commissioning and diagnosis
Access to device specific engineering documentation
Connectivity to Asset Monitoring and Asset Management System
Connectivity to Device Management System
Connectivity to Remote Computerized Maintenance Management system.

The LCMS uses the information aggregated in Device Integration Aspect Objects along with information obtained from local Asset Monitors located in the physical process plants, to perform Asset Optimization for IEDs. Since the Device Integration Aspect Objects contain several pieces of relevant information such as engineering documentation, maintenance data, data sheets pertaining to the individual devices etc., the LCMS is able to perform holistic management and optimization, to enhance the life of the IEDs deployed in the field. For example, if an IED encounters a problem, this is reported to the LCMS by the Asset Monitor in the plant. The LCMS goes on to look up the pertinent design documentation that has an answer to the problem. Further, the LCMS might send this error condition to a remote device-vendor, who can send the solution back to the LCMS. This way, the life of the asset is enhanced since a multitude of information and diagnostic support is made available to correct whatever operational challenges the IED/asset may face in it's lifetime.

Figure 3:
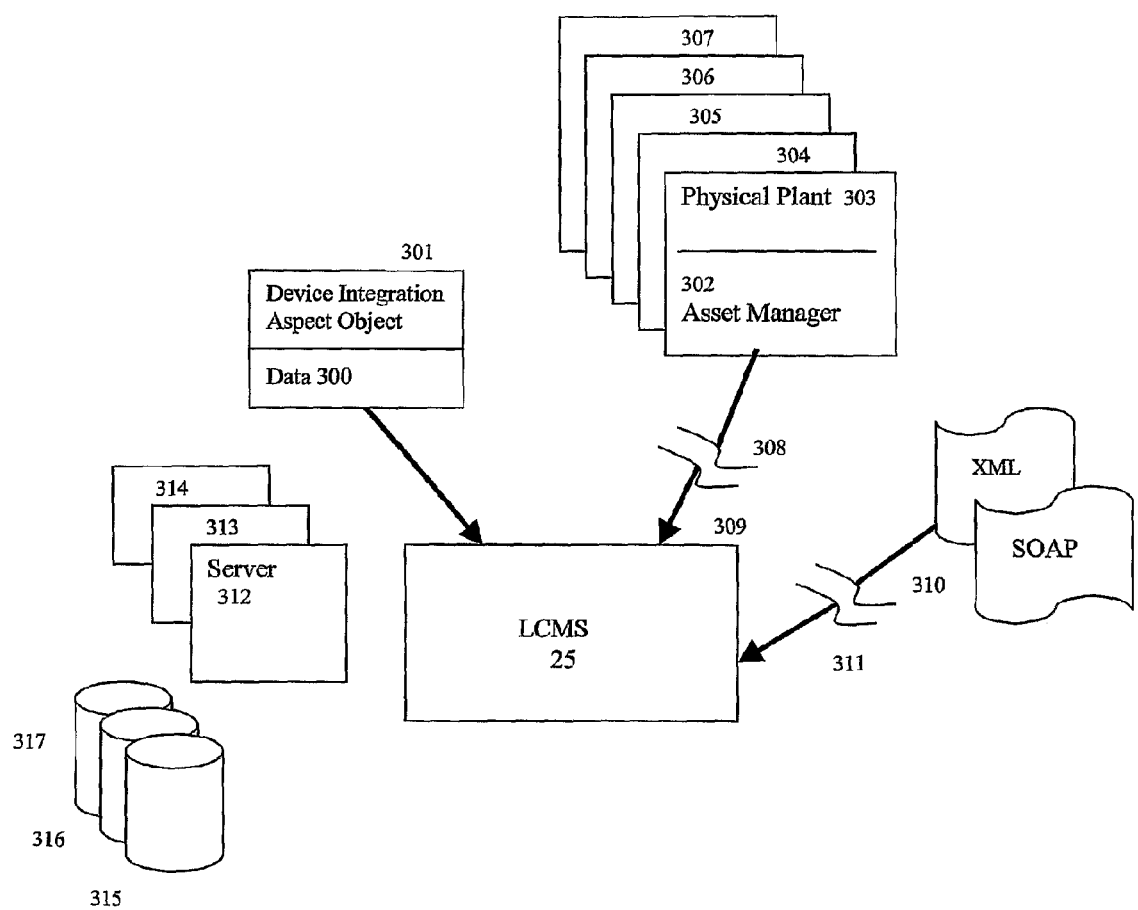
FIG. 3 shows a modular overview of the various components in a Life Cycle Management System.

FIG. 3 shows a modular overview of the various components in a Life Cycle Management System. Utilizing data 300 stored in Device Integration Aspect Objects 301, and information from various asset or device monitors 302 in one or several physical plants 303, 304, 305, 306, 307, each having their own individual configurations, Operating System platforms and maintenance software, the LCMS 25, performs Asset Management and optimizes the life of the assets in a process plant. It further provides a location-independent design to provide such control and management/optimization functionality by means of connectivity applications, which are used as conduits to communicate information, over such distributed network configurations such as the Internet. Such communication can occur between the customer, whose physical process plants 303, 304, 305, 306, 307, the LCMS of the present invention is controlling. This multitude of process plants indicates the LCMS using a clustered and scalable strategy and demonstrates its use and applicability in a large processing complex. Subsequently, when necessary, connectivity applications 308,309 can be used to communicate error information with device vendors or to communicate with any of other CMMS systems or Web Library Servers, which provide updates for various network protocols etc. Further, the LCMS is able to communicate with device vendors, by means of connectivity applications 310, 311, in order to facilitate location-independent debugging or error diagnostics. The LCMS employs one or a plurality of servers 312, 313, 314 to carry out Asset Management along with a data store or a plurality of data stores 315, 316, 317. The data store could optionally use a Redundant Array of Independent Disks, for better availability. The information that is communicated between the different modules is secured by known authentication means. Optionally, the information is accessible by authenticated parties with the use of the Simple Object Access Protocol, or any other markup language 310, 311.

Figure 9:
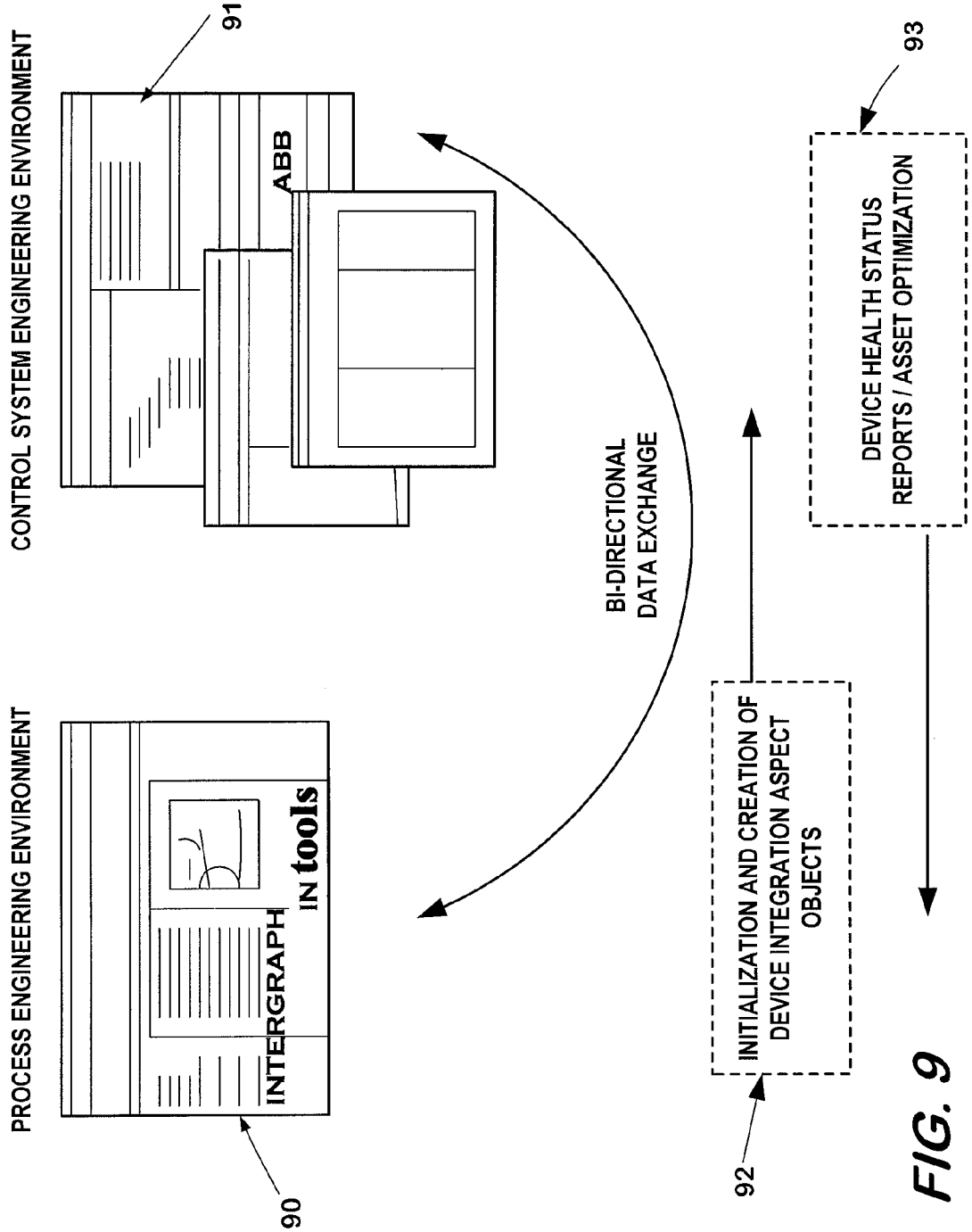
FIG. 9 shows the bi-directional data exchange between the process engineering environment and the control system engineering environment.

A two way communication has to occur between the process plant (303-307 in FIG. 3) and 38 in FIG. 2) and the control system engineering environment, placed within the LCMS. The communication provides means for the exchangeability of process data, like limits, alarm values or units, between the IEDs and Control module logic and function block structures, within the LCMS, confirming to, IEC-61149, IEC61131-3 and IEC 61804-2. FIG. 9 shows the bi-directional data exchange between the process engineering environment (PEE) 90 and the control system engineering environment (CSEE) 91 residing within the LCMS. From this exchange we see that the system is configured or initialized 92 with the creation of Device Integration Aspect Objects through an exchange of information between the PEE and the CSEE. Furthermore, the health of the IED is communicated from the control system to the process engineering environment 93. The LCMS has means to enable this exchange while making provisions for various document formats.

Figure 10:
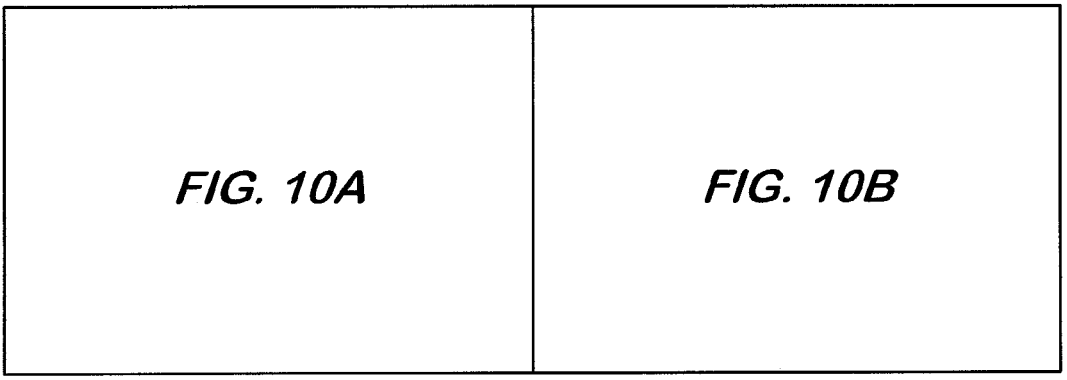
FIG. 10 shows the Asset Monitor Report, used to communicate device information.
Figure 10A:
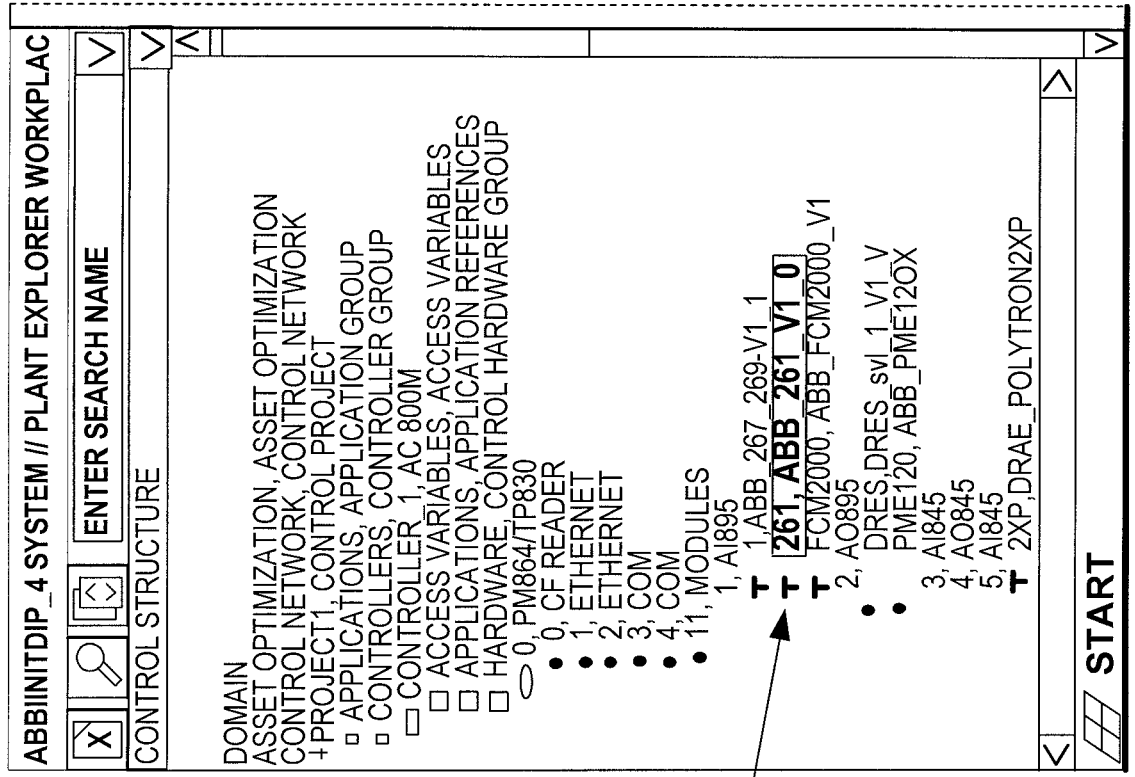
Figure 10B:
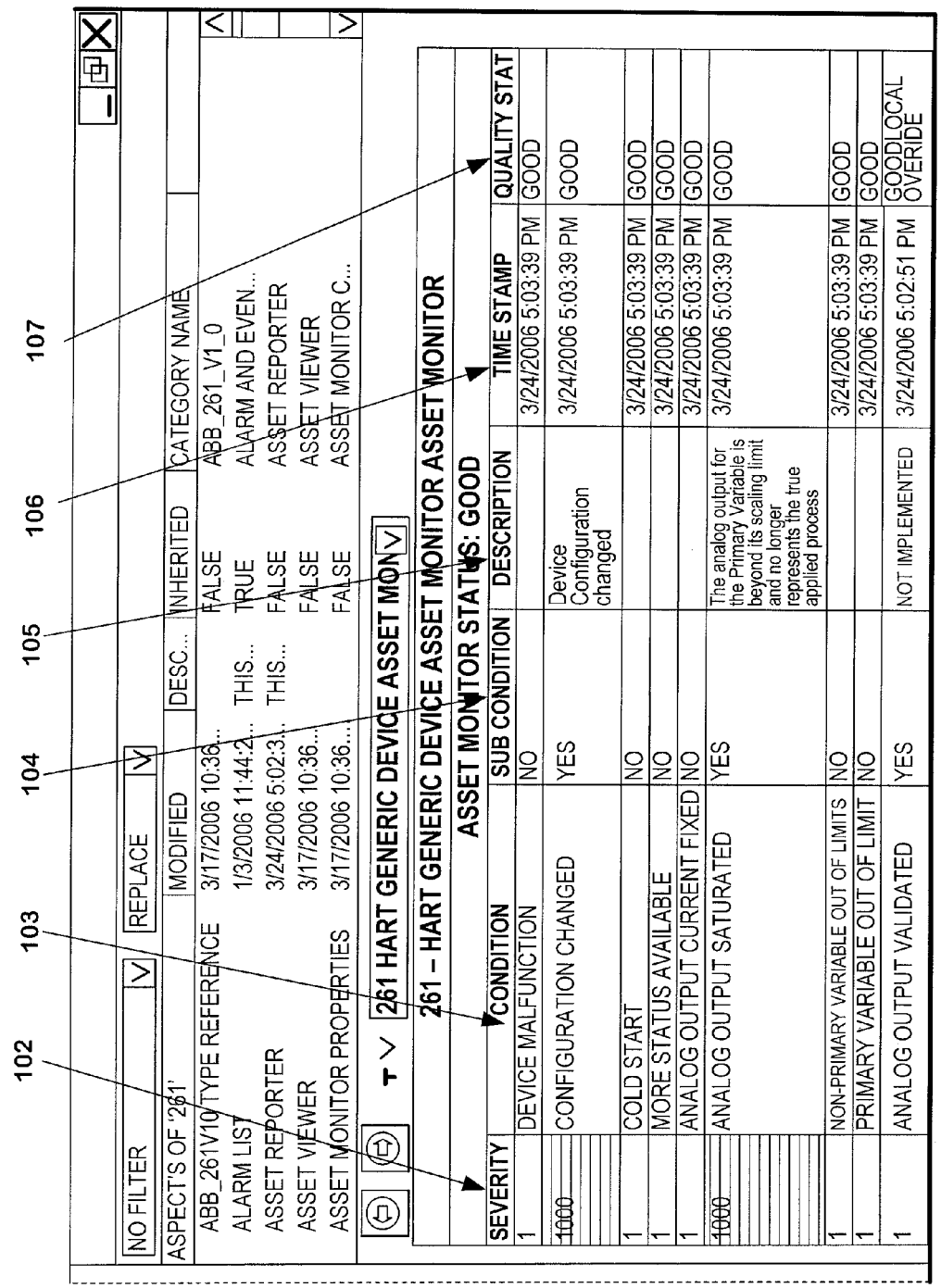

The IED information is communicated through the Asset Monitor Reports 100, shown in FIG. 10. They contain a plurality of information such as the severity of the condition 102, the condition itself 103, the sub-condition 104, the description of the condition 105, the timestamp associated with the condition 106 and the quality status 107.

Figure 11:
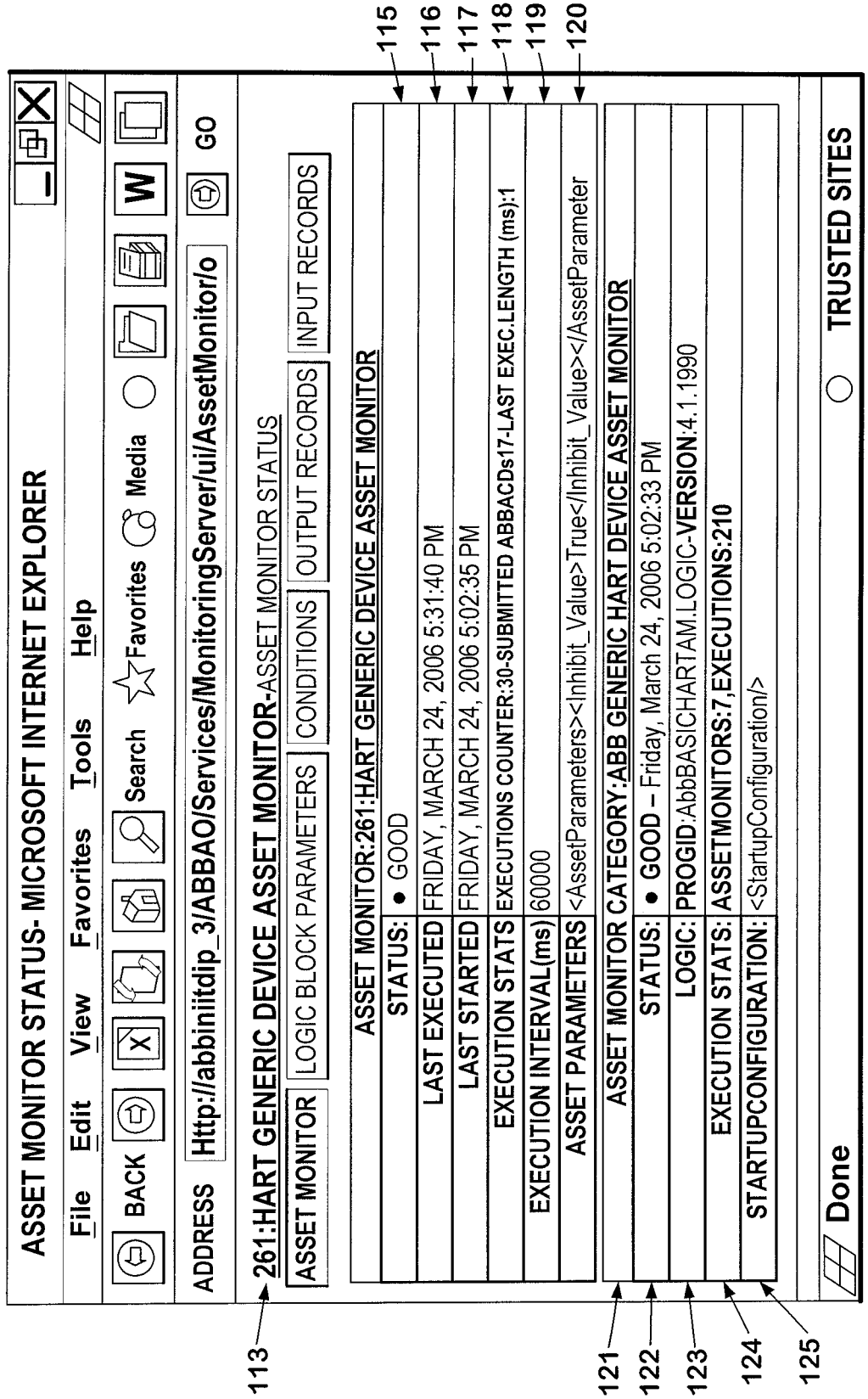
FIG. 11 shows the Asset Monitor status reports.

FIG. 11 shows the Asset Monitor status reports. The HART generic device Asset Monitor 113 in this case was found to have a good status 115, have its details about the last execution 116, and the last time it was started 117, with the execution statistics 118, the execution interval 119 and the asset parameters 120, being shown in the Asset Monitor Status 121. Every device has only the set of information relevant to it being shown. For example, the Asset Monitor for the ABB Generic HART Device 121, has only a status field 122, a Logic field 123, an execution statistics field 124 and a startup configuration field 125.

Figure 12:
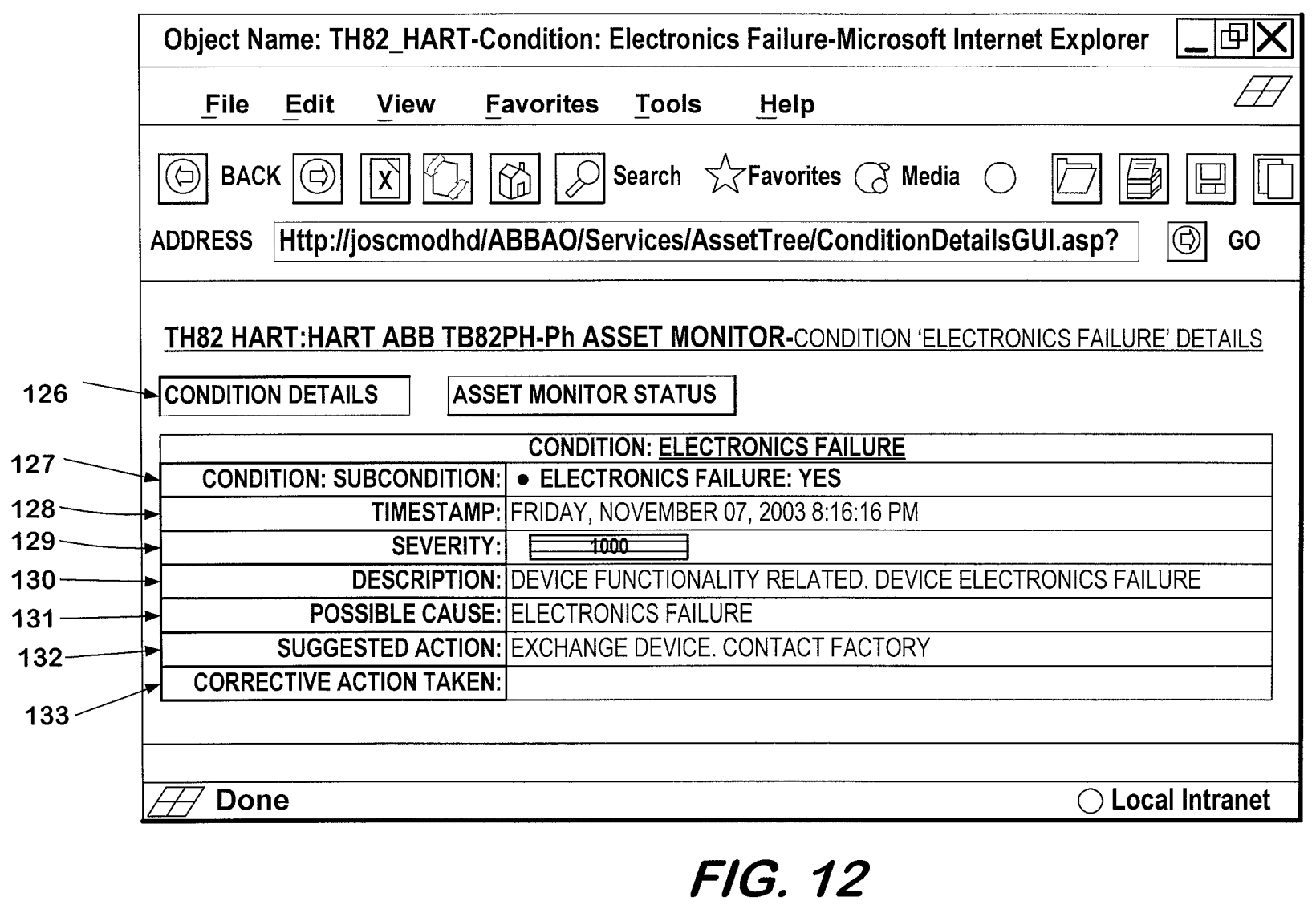

FIG. 12 shows the Asset Condition Report generated by the LCMS. The asset's condition details 126, are communicated by means of detailing the exact condition or sub-condition 127, a time-stamp recording when the condition took place 128, the severity of the condition 129, a description of the condition 130, the possible cause of the condition 131, the suggested action 132, and a log of the corrective action taken 133.

FIG. 10-FIG. 12 also demonstrate the homogeneous visual handling and navigation means for accessing Device Integration Aspect Objects and their aspects in Plant/Functional/Location Structures, within the LCMS.

The LCMS generates an Asset Condition Report and advises the vendor standard predictive maintenance service actions, extending the on-stream availability of IED. Such information can be send via the Internet to any web client or to customer devices such as mobile phones, e-mail accounts and pagers. Further, the LCMS provides connectivity to the third party systems for Device Management and Computerized Maintenance Management Systems.

In current practice, device vendors provide several remote services and a multitude of web library servers (for different bus protocols such as PNO, ProfiBus, FIART etc.), also enabled by the Internet. The design paradigm is rapidly evolving towards increasing the role of the Internet in basic connectivity of devices and other operations on devices. The LCMS of the present invention takes this design paradigm into consideration and makes provisions for it.

Figure 13A:
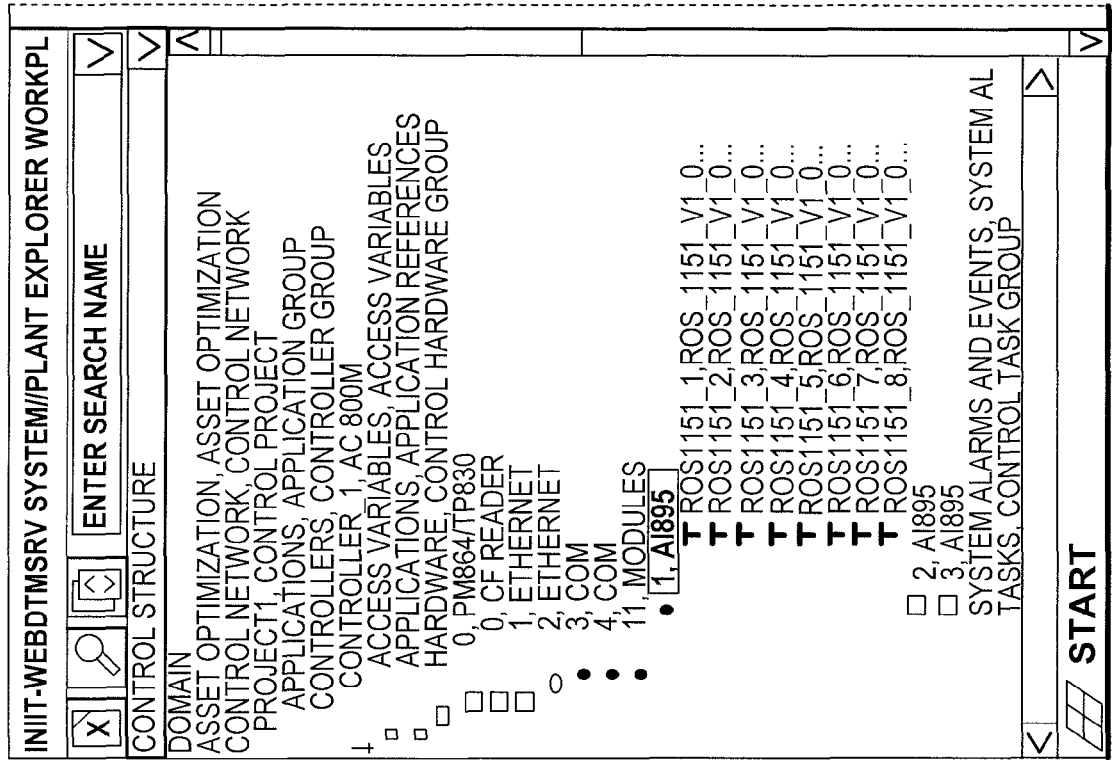
FIG. 13 shows the integration of the Internet in the process control systems.
Figure 13B:
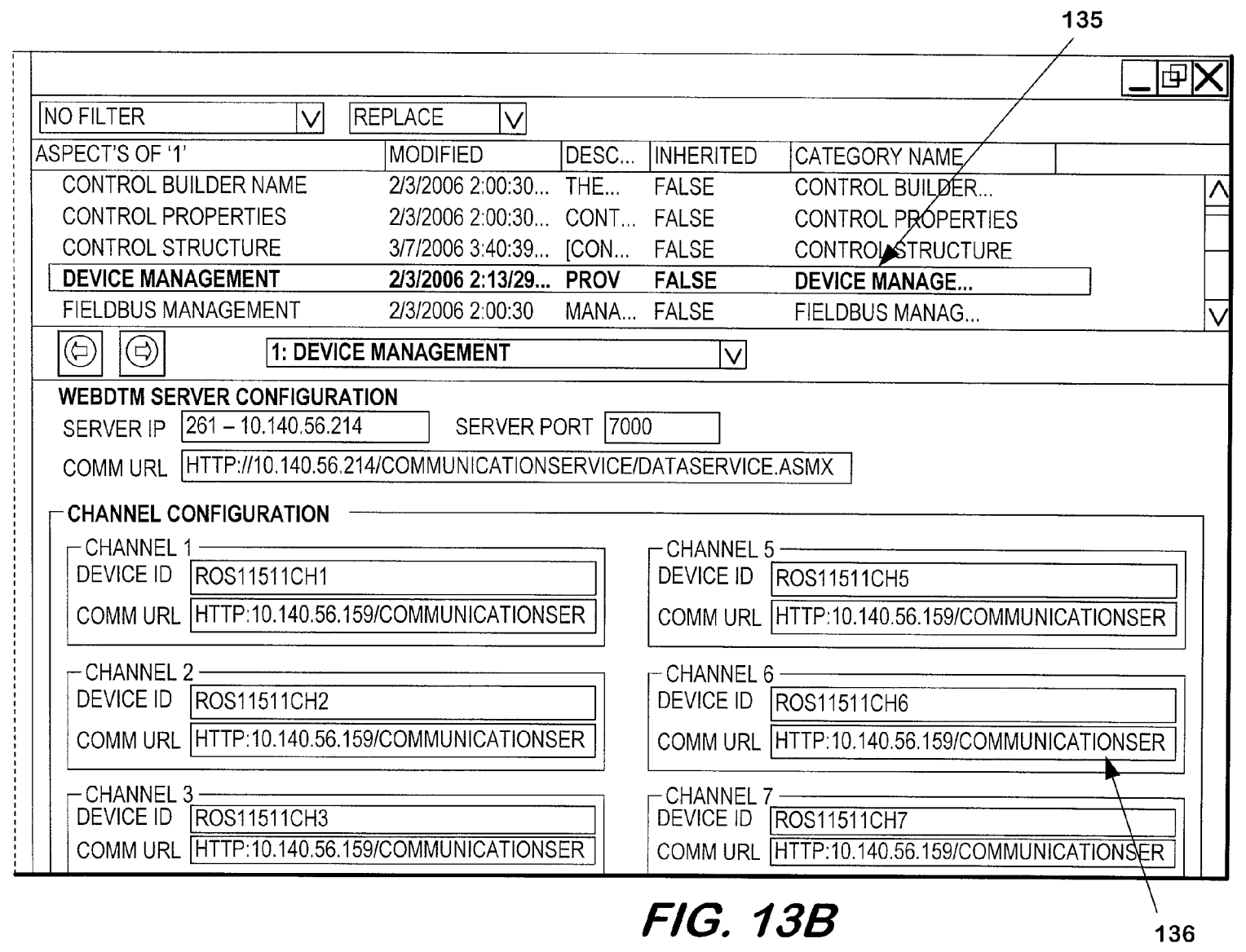

FIG. 13 shows the integration of the Internet in the process control systems. DTMs are popularly made available by vendors online and device specific DTMs can be downloaded 136 when the customer wants to perform device management 135.

The LCMS of the present invention ensures that only the libraries that have passed the check for version compatibility are imported. As the import of objects from the library for the installation/commissioning and application integration functionalities can be rejected, for example, due to version incompatibility, unknown origin, invalid or outdated certifications, etc customers do not have the risk of getting stuck midway in the installation/commissioning process or having face problems in restoring the status-ante. However, a device and its according software cannot be seen as a single entity. Hence, the LCMS has a much wider focus and includes version checks for the operating system or for control system applications like the Control Function Designer, which is used to graphically build the control logic. Hereby the LCMS also considers the customer's inputs, for example whether the installation/commissioning needs to be conform to IEC 61131-3 or IEC-61804-2 standards and assigns the according documentation. The advantage for the customer is that the system is ready for use, directly after the installation/commissioning and without any further regression tests. This methodology reduces the down time incurred for updates significantly.

Figure 8:
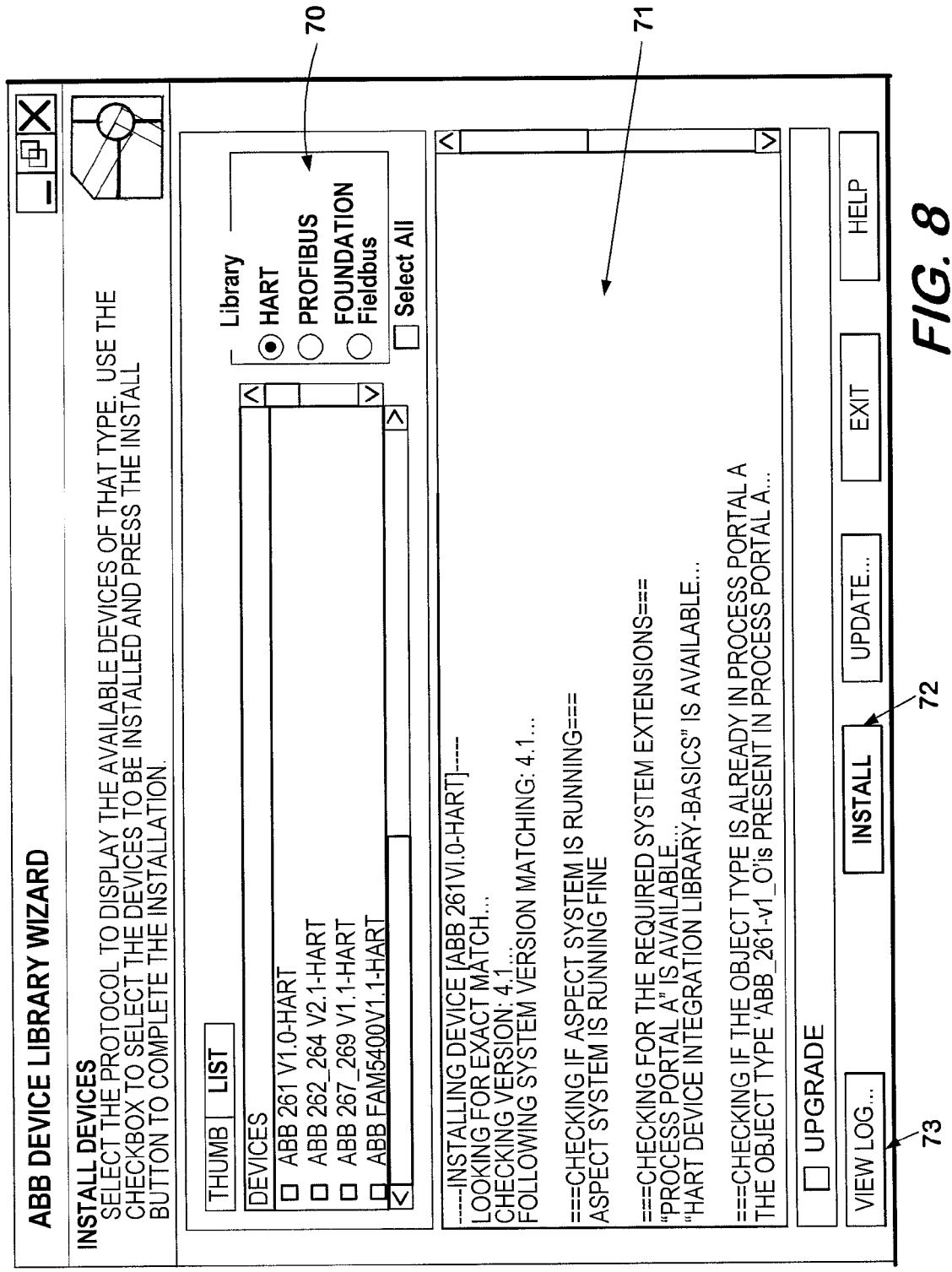
FIG. 8 shows another feature of the LCMS, which involves version checking the overall system.

FIG. 8 shows another feature of the LCMS, which involves version checking the overall system 71, before downloading/upgrading or updating the system in any way. Updates can be made available for a plurality of IEDs or networks 70 and means exist to log the results of the version checking 73 and controlling what is finally installed or rejected 72.

The LCMS of the present invention seeks to provide control and optimization in a location-independent fashion, making provisions for such distributed environments as enabled by the Internet.

Plant operators have available to them a variety of desktop tools, hand-held devices and commercially available Personal Data Assistants (PDAs) to enable them to receive and analyze information pertaining to the IEDs in the plant. The LCMS of the present invention is capable of sending information, having to do with the life cycle of any IED within the plant, to a plant operator, via the Internet. The information is communicated by means of a connectivity application. This connectivity application is provided by the LCMS to ensure at any time that the local applications are in sync with the core system. However, the asset conditions can be checked locally via any standard web browser or customer device as described above.

The benefit of this approach is that the customer can observe and maintain DDEs locally without the need of a full-blown Control or Asset Optimization or Life Cycle Management system that is physically co-located with the process plant. That means the customer has the full asset management functionality as described above without the initial investment for a local control system and without the ongoing maintenance costs for system updates or version management as described in the first part of the invention disclosure.

Another advantage of this architecture is that it allows involvement of the device vendor during error diagnosis without the requirement of being on site. Therefore, the vendor simply downloads the connectivity application and can simulate any error condition at another site, to reproduce problems on customer site and will get the according response from the Asset Management Server. This implies that device vendors will have very lean and cost efficient approach for customer specific maintenance. Device vendors can connect to the information made available by the LCMS in order to provide diagnostic support, without being physically present at the plant site.

Figure 14:
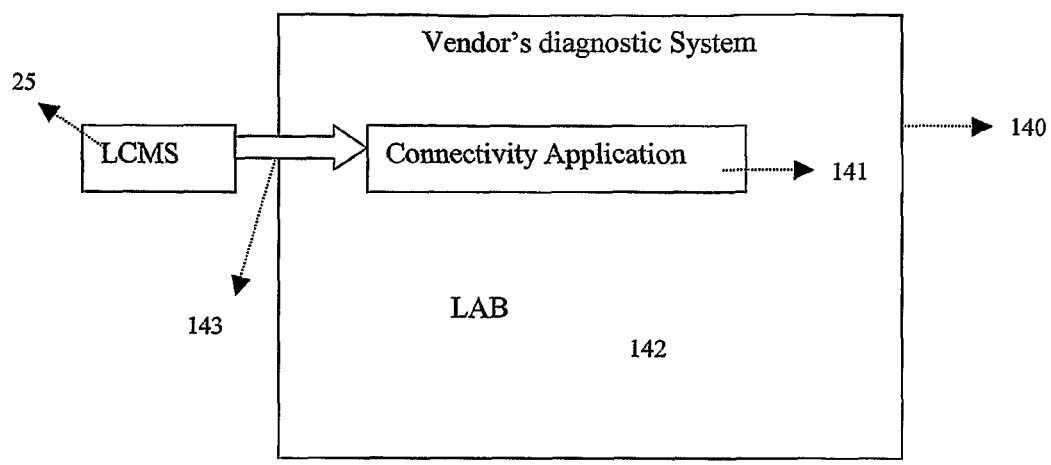
FIG. 14 shows the connectivity application provided to the vendor to enable location-independent diagnostics.

The vendor's diagnostic sub-system 140, shown in FIG. 14 just downloads the connectivity application 141 over the Internet 143 and can simulate any error condition at his lab 142 to reproduce problems on customer site and will get the according response from the LCMS 25. That means that device vendors will have very lean and cost efficient approach for customer specific maintenance.

What is claimed is:

1. A method of managing a life cycle of a plurality of Intelligent Electronic Devices (IEDs), also referred to as assets, in a process plant for an end-user in which in the life cycles of the IEDs go through:
   a. an Engineering phase
   b. an Installation/commissioning phase; and
   c. an Operational phase, the method comprising the steps of:
      a. creating a Device Integration Aspect Object by collecting data such as engineering design data documentation during the engineering phase of the IED's development or the plant setup, plant configuration data relating to the set up of the IED or the process plant applicable to the installation/commissioning phase, data from maintenance management software that are integrated with the IED or the process plant applicable to the operational phase and diagnostic data about the health of the device in the process plant applicable to the operational phase;
      b. utilizing the Device Integration Aspect Object, in a Life Cycle Management System (LCMS) for managing information from different phases in the lifecycle of the IED or the process plant;
      c. performing homogenization and version control checks to help the end user optimize the life of the IED applicable to both the installation/commissioning and operational phases, the version control checks facilitate the import of only those pre-configured Device Integration Aspect Objects from the libraries which passed the check for version compatibility, and the version control checks perform homogenization to help the end user optimize the life of the IED applicable to both the installation/commissioning and operational phases;
      d. performing Asset Management, to prolong the life of the asset applicable to the operational phase;
      e. supporting a plurality of formats and standards across documentation, maintenance data, diagnostic tools, network protocols, control protocols, Operating System platforms and programming environments to manage the life cycle, applicable to all the phases; and
      f. performing life cycle management in a location-independent fashion, the location-independent fashion providing a connectivity application that allows connecting and managing IEDs via the Internet; and
      h. providing a highly available Life Cycle Management Server without a connected control system to provide the life cycle management service for distributed systems via the Internet.

2. The method of claim 1, wherein the step of collecting engineering design data includes information from data sheets pertaining to the IEDs in the process plant, DD/EDD/Capability source files and device specific DTMs.

3. The method of claim 1, wherein the step of collecting installation and commissioning data includes information from manuals, maintenance and spare parts manuals, project specific documents and lists detailing interchangeable IEDs with their operating procedures.

4. The method of claim 1, wherein the step of collecting data provides for format independent aggregation of different documents.

5. The method of claim 1, wherein the step of collecting engineering design data includes the step of using a communication format based on a markup language.

6. The method of claim 1, wherein the step of collecting plant configuration data includes the step of collecting data pertaining to a plurality of bus networks that might be used to interconnect various IEDs in the process plant, the topology of said networks, the IEDs they are used to connect, unique parameters of these IEDs and calibration details about a Network Capable Application Processor (NCAP) adhering to the ISO/EEC standard.

7. The method of claim 1, wherein the step of collecting diagnostic data about the health of the IED in the process plant, also referred to as assets, includes the step of collecting data pertaining to asset operational status, an asset diagnostic alarm, an asset condition report, an asset performance trend report, an asset maintenance status, and asset remote servicing recommendation and operator notes for asset usage constraints.

8. The method of claim 1, wherein the step of performing LCMS in a location-independent fashion includes the step of providing a connectivity application.

9. The method of claim 1, wherein the step utilizing a Device Integration Aspect Object, in a Life Cycle Management System (LCMS) for managing information from different phases in the lifecycle of the IED or the process plant comprises the steps of:
   a. Populating the Device Integration Aspect Objects;
   b. Accessing the Device Integration Aspect Objects during the course of managing the life cycle.

10. The method of claim 9, wherein the step of populating the Device Integration Aspect Objects includes the steps of collecting information about various Aspects of the device, which are perspectives on the device under one or more categories.

11. The method of claim 9, wherein the step of populating the Device Integration Aspect Objects includes the steps of collecting information about various Aspects of the device such as:
   a. Field Device/Sensor definition Aspect;
   b. Field Bus/Sensor Network Management Aspect;
   c. Device/Sensor Health Monitoring and Diagnostics Aspects and
   d. Documentation Aspect.

12. The method of claim 1, wherein the step of collecting plant configuration data accumulates the data into a Definition Aspect and a Network Management Aspect.

13. The method of claim 11, where the Field Bus/Sensor Network Management Aspect contains information including:
   i. Field Bus/ Sensor Network Topology Definition and Management;
   ii. Network Capable Application Processor Definition and Management;
   iii. Smart Transducer Interface Module Definition and Management;
   iv. Network Topology overview-Status of Devices/Sensors/Modules/Processors/Device/Sensor Management Aspect;
   v. Modification of Parameters unique to the Device/ Sensor;

vi. Perform As-found/As-left calibration checks for the Device;
vii. Perform Device calibration;
viii. Perform Device/Sensor characterization and
ix. Device Management Event Log Reports.

14. The method of claim 11, where the Device/Sensor Health Monitoring and Diagnostics Aspect contains information including:
i. Asset operational status;
ii. Asset Diagnostic Alarm;
iii. Asset Condition Document;
iv. Asset Performance Trend;
v. Asset condition Reporting;
vi. Asset Maintenance Status;
vii. Asset Remote servicing Recommendations and
viii. Operator notes for Asset usage constraints.

15. The method of claim 11, where the Documentation Aspect contains information including:
i. Data sheet;
ii. DD/EDD/Device Capability source files;
iii. Device Specific DTM;
iv. Installation &Commissioning Manual;
v. Maintenance & Spare Parts Manual;
vi. Project specific documents (Instrument specification, Installation & Impulse piping diagram, Loop wiring diagram etc.,) and
vii. List, source of Plug &Play Devices that can replace the Device in use; operating procedures for interchanging the devices.

16. The method of claim 1, wherein the step of collecting data includes the step of converting documentation reversibly from a set of proprietary formats to a standard format.

17. A Life Cycle Management System (LCMS) to control the Intelligent Electronic Devices (IEDs) in a process plant, the LCMS comprising:
a. a plurality of IEDs that are connected by networks and device-specific protocols;
b. a plurality of computers including communication devices communicating with said computers, computer networks and IEDs the plurality of connected computers performing Life Cycle management;
c. a data-store for storing information relating to the LCMS;
d. a software object for incorporating information about different Aspects of a device;
d. data aggregation means to populate said software object by gathering different engineering sub systems with the corresponding engineering documents and support systems, hereby referred to as a Device Integration Aspect Object;
e. version control means to ensure compatibility of installed components, wherein the version control means facilitates the import of only those pre-configured Device Integration Aspect Objects from the libraries which passed the check for version compatibility, and wherein the version control means perform homogenization to help the end user optimize the life of the IED applicable to both the installation/commissioning and operational phases;
f. asset management/optimization means to maximize the life of an asset/device;
g. means to support a plurality of formats and standards across documentation, maintenance data, diagnostic tools, network protocols, control protocols, Operating System platforms and programming environments;
h. location-independent communication means to communicate with the customer as well as device vendors and other parties that assist in maintenance or those that assist in providing information on the various stages in the lifecycle of the product, wherein the location-independent communication means provides a connectivity application that allows connecting and managing IEDs via the Internet; and
i. a highly available Life Cycle Management Server without a connected control system to provide the life cycle management service for distributed systems via the Internet.

18. The Life Cycle Management System of claim 17, wherein the version control means has the capability to import device description source files like DD/EDD/CFF and to manage and validate them within the version control system.

19. The Life Cycle Management System of claim 17, wherein the version control means possesses the capability to build DTMs from device description source files and to include these DTM into the version management.

20. The Life Cycle Management System of claim 17, wherein the version control means has the capability to build Device Integration Aspect Objects with Device Type Managers (DTM) which are supplied by 3rd party vendors without jeopardizing the stability of the control system by unknown software components.

21. The Life Cycle Management System of claim 17, wherein the version control means further comprises testing means comprising testing tools in the LCMS to test and validate the target FDT frame application before installing any DTMs.

22. The Life Cycle Management System of claim 17, wherein the gathering different engineering sub systems with the corresponding engineering documents and support systems includes
a. Document Managers for document Administration;
b. Library Assistants;
c. Reuse Assistants;
d. Cross-reference tools and
e. Document Import /Export.

23. The Life Cycle Management System of claim 17 wherein a distributed software system executing Life Cycle Management Page 8 of 13 implements a control and management strategy for the Intelligent Electronic Devices (IEDs) in the plant, the control strategy incorporating information from Device Integration Aspect Objects and Asset monitors, placed in the plant which report the status of the asset/device, along with incorporating information from other maintenance management tools, said software system executing Life Cycle Management being capable of accommodating a variety of maintenance tools and standards, data formats, documentation formats and communication formats.

24. The Life Cycle Management System of claim 23 wherein the distributed software system is capable of communicating information to device-vendors and customers through a connectivity application.

25. The Life Cycle Management System of claim 23 wherein the distributed software system is capable of communicating information to device-vendors and accept their diagnosis and integrate that diagnosis while managing the life of the asset/device.

26. The Life Cycle Management System of claim 17, said system controlling a process plant comprising a plurality of Intelligent Electronic Devices (IEDs) that are connected by networks implementing different protocols such as ProfiBus, Device Net, Foundation Field Bus (for the Process Industries), Inter Bus S, Control Net and CAN Open (for the Discrete Manufacturing Industries) and HART.

27. The Life Cycle Management System of claim 17, with means to ensure the exchangeability of process data, like limits, alarm values or "units, between the IEDs and Control module logic and function block structure confirming to, IEC-61149, BBC61131-3 and EEC 61804-2.

28. The Life Cycle Management System of claim 17, Page 9 of 13 with means to ensure that the control system provides a homogeneous and holistic audit trail system.

29. The Life Cycle Management System of claim 17, with homogeneous visual handling and navigation means for accessing Device Integration Aspect Objects and their aspects in Plant/Functional/Location Structures.

30. The Life Cycle Management System of claim 17, with known authentication methods used to provide secure access to the Life Cycle Management System and all of its components, for all the parties requiring such access.

31. The Life Cycle Management System of claim 17, with storage means to store IED attributes (static and dynamic) that can be accessed by enterprise wide users with Simple Object Access Protocol.

32. The Life Cycle Management System of claim 17, with redundancy means including a Redundant Array of Independent Disks.

33. The Life Cycle Management System of claim 17, with scalability means incorporating a clustered strategy, for the application of the solution to a large processing complex.

34. The method of claim 1, wherein the method is carried out by a computer program product containing software code means loadable into the internal memory of a computer in a computerized system.

35. The computer program product of claim 34, wherein the computer program product is embodied on a non-transitory computer readable medium.

36. A computer implemented web-centric Life Cycle Management System (LCMS) implemented using client/server technology for providing a Life Cycle Management mechanism for process plants with complex and diverse internal layouts having a number of Intelligent Electronic Devices (IEDs), the computer implemented web-centric LCMS comprising:
   an asset management system that takes input about the IEDs aggregated in one or a plurality of software objects, called a Device Integration Aspect Object,
   a plurality of computers including communication devices communicating with said computers computer networks and IEDs, the plurality of connected computers performing Life Cycle management, and
   a Life Cycle Management Server without a connected control system to provide the life cycle management service for distributed systems via the Internet,
   wherein the asset management system combines information with device or asset performance status or condition reports obtained from either of the process plant or other enterprise software which might be integrated with the process plant for purposes of maintenance, to provide a holistic life cycle management system which extends the on-stream availability of the IEDs, and
   wherein the asset management system provides version control that facilitates the import of only those pre-configured Device Integration Aspect Objects from the libraries which passed the check for version compatibility and performs homogenization to help the end user optimize the life of the IED applicable to both the installation/commissioning and operational phases to ensure stability of the IEDs within the LCMS and,
   wherein the asset management system provides location-independent device health monitoring and repair by device vendors and location-independent asset management and control to the customer who owns the process plant, where the location-independent device health monitoring provides a connectivity application that allows connecting and managing IEDs via the Internet, and
   wherein the computer implemented web-centric LCMS is implemented by a computer program product containing software code means loadable into the internal memory of a computer in a computerized system.

37. The LCMS of claim 36, wherein the Intelligent Electronic Devices (IEDs) in the process plant, device vendors, display devices for the customer and other maintenance management software communicate with the LCMS using a standard interface, said interface being customized for programs, vendors, data exchange and tools.

38. The LCMS of claim 36, wherein the asset management system improves the availability of the intelligent electronic devices or assets, by using a combination of information present in the Device Integration Aspect Object and the asset monitor input from the process plant.

39. A computer implemented web-centric Life Cycle Management System (LCMS) implemented using client/server technology for providing a Life Cycle Management mechanism for process plants with complex and diverse internal layouts, having a number of Intelligent Electronic Devices (IEDs), the computer implemented web-centric LCMS comprising:
   an asset management system that takes input about the IEDs aggregated in one or a plurality of software objects, called a Device Integration Aspect Object,
   a plurality of computers including communication devices communicating with said computers,
   computer networks and IEDs, the plurality of connected computers performing Life Cycle management,
   and a Life Cycle Management Server without a connected control system to provide the life cycle management service for distributed systems via the Internet,
   wherein the asset management system combines information with device or asset performance status or condition reports obtained from either of the process plant or other enterprise software which might be integrated with the process plant for purposes of maintenance, to provide a holistic life cycle management system which extends the on-stream availability of the IEDs,
   wherein the asset management system provides version control the facilitates the import of only those pre-configured Device Integration Aspect Objects from the libraries which passed the check for version compatibility and performs homogenization to help the end user optimize the life of the IED applicable to both the installation/commissioning and operational phase ensure stability of the IEDs within the LCMS and location-independent device health monitoring and repair by device vendors and location-independent asset management and control to the customer who owns the process plant,
   wherein the computer implemented web-centric LCMS is implemented by a computer program product containing software code means loadable into the internal memory of a computer in a computerized system, which performs the method of managing a life cycle of a plurality of Intelligent Electronic Devices (IEDs), also referred to as assets, in a process plant for an end-user in which in the life cycles of the IEDs go through
   a. an Engineering phase
   b. an Installation/commissioning phase
   c. an Operational phase the method comprising the steps of:
a. creating a Device Integration Aspect Object by collecting data such as engineering design data documentation during the engineering phase of the IED's development or the plant setup, plant configuration data relating to the set up of the IED or the process plant applicable to the installation/commissioning phase, data from maintenance management software that are integrated with the IED or the process plant applicable to the operational phase and diagnostic data about the health of the device in the process plant applicable to the operational phase;
b. utilizing the Device Integration Aspect Object, in a Life Cycle Management System (LCMS) for managing information from different phases in the lifecycle of the IED or the process plant;
c. performing homogenization and version control checks to help the end user optimize the life of the IED applicable to both the installation/commissioning and operational phases;
d. performing Asset Management, to prolong the life of the asset applicable to the operational phase;
e. supporting a plurality of formats and standards across documentation, maintenance data, diagnostic tools, network protocols, control protocols, Operating System platforms and programming environments to manage the life cycle, applicable to all the phases; and
f. performing life cycle management in a location-independent fashion, the location-independent fashion provides a connectivity application that allows connecting and managing IEDs via the Internet.

* * * * *